United States Patent [19]

Ishii

[11] Patent Number: 4,982,293

[45] Date of Patent: Jan. 1, 1991

[54] METHOD OF COMPRESSING HALFTONE IMAGE DATA

[75] Inventor: Hitoshi Ishii, Yokohama, Japan

[73] Assignee: Ricoh Company, Ltd., Japan

[21] Appl. No.: 359,044

[22] Filed: May 30, 1989

[30] Foreign Application Priority Data

| Jun. 2, 1988 | [JP] | Japan | 63-134372 |
| Oct. 3, 1988 | [JP] | Japan | 63-247473 |
| Feb. 16, 1989 | [JP] | Japan | 1-34943 |

[51] Int. Cl.⁵ ............................................. H04N 1/40
[52] U.S. Cl. ................................... 358/429; 358/432; 358/261.3
[58] Field of Search .................. 358/429, 432, 261.3

[56] References Cited

U.S. PATENT DOCUMENTS 3,849,592  11/1974  Rosenheck .................. 358/429
4,266,249  5/1981  Chai ............................. 358/429

Primary Examiner—Howard W. Britton
Attorney, Agent, or Firm—Mason, Fenwick & Lawrence

[57] ABSTRACT

A method applicable to an image filing system or similar system for recording data representative of a halftone image by compressing the data and reconstructing the compressed data. In an input two-dimensional halftone image, the coordinates points where a difference of density changes in the x direction are determined to produce an x direction transition point pattern associated with the coordinates. A y direction transition point pattern is produced by effecting similar processing in the y direction. Further, an AND pattern of the x direction and y direction transition point patterns is generated. The pixels based on the AND pattern are determined to be the characteristic density and are coded, the densities of the other pixels being calculated at the time of decoding. The transition patterns are individually coded by transforming the differences of density data into Huffman codes.

10 Claims, 23 Drawing Sheets

|60|40|20|20|20|25|30|25|20|20|20|40|
|---|---|---|---|---|---|---|---|---|---|---|---|
|50|40|20|30|30|35|40|35|30|30|25|20|
|40|30|20|30|40|45|50|45|40|30|20|15|
|30|30|30|45|50|50|55|50|40|30|20|10|
|20|30|40|50|60|50|60|50|40|30|20|5|
|10|30|50|55|70|70|80|70|55|40|25|0|
|0|30|45|60|65|90|100|90|70|50|30|10|
|10|30|50|55|60|80|90|80|65|50|35|20|
|20|30|40|50|60|70|80|70|60|50|40|30|
|40|50|50|50|55|60|65|60|55|50|45|40|
|60|70|60|50|50|50|50|50|50|50|50|50|
|80|70|60|50|40|30|35|40|45|50|55|60|

A

|60| |20| |20| |30| |20| |20|40|
|---|---|---|---|---|---|---|---|---|---|---|---|
|50|40|20|30|30| |40| |30|30| |20|
|40| |20| |40| |50| |40| |20|15|
|30| |30| |50|50|55|50| | | |10|
|20| | | |60|50|60| | |20|5|
|10| |50|55|70|70|80|70|55| |25|0|
|0|30| |60|65|90|100|90| | | |10|
|10| |50| |60|80|90|80|65| |35|20|
|20| | | | |80| | | | |30|
|40|50| |50| |65| | | | |40|
|60|70| |50| | | | | | |50|
|80| | | |30| | | | | |60|

Fig. 6C

| 1 | 0 | 1 | 0 | 1 | 0 | 1 | 0 | 1 | 0 | 1 | 1 |
|---|---|---|---|---|---|---|---|---|---|---|---|
| 1 | 1 | 1 | 1 | 1 | 0 | 1 | 0 | 1 | 1 | 0 | 1 |
| 1 | 0 | 1 | 0 | 1 | 0 | 1 | 0 | 1 | 0 | 1 | 1 |
| 1 | 0 | 1 | 0 | 1 | 1 | 1 | 1 | 0 | 0 | 0 | 1 |
| 1 | 0 | 0 | 0 | 1 | 1 | 1 | 0 | 0 | 0 | 1 | 1 |
| 1 | 0 | 1 | 1 | 1 | 1 | 1 | 1 | 1 | 0 | 1 | 1 |
| 1 | 1 | 0 | 1 | 1 | 1 | 1 | 1 | 0 | 0 | 0 | 1 |
| 1 | 0 | 1 | 0 | 1 | 1 | 1 | 1 | 1 | 0 | 1 | 1 |
| 1 | 0 | 0 | 0 | 0 | 0 | 1 | 0 | 0 | 0 | 0 | 1 |
| 1 | 1 | 0 | 1 | 0 | 0 | 1 | 0 | 0 | 0 | 0 | 1 |
| 1 | 1 | 0 | 1 | 0 | 0 | 0 | 0 | 0 | 0 | 0 | 1 |
| 1 | 0 | 0 | 0 | 0 | 1 | 0 | 0 | 0 | 0 | 0 | 1 |

| 60 | 40 | 20 | 20 | 20 | 25 | 30 | 25 | 20 | 20 | 20 | 40 |
|----|----|----|----|----|----|----|----|----|----|----|----|
|    | 40 |    | 30 |    |    |    |    |    | 30 | 25 | 20 |
|    | 30 | 20 | 30 |    | 45 | 50 | 45 | 40 |    | 20 |    |
|    |    |    | 45 |    | 50 |    | 50 |    |    |    |    |
|    |    |    |    |    | 50 | 60 | 50 | 40 | 30 | 20 |    |
|    |    | 50 |    | 70 |    |    |    |    |    |    | 0  |
| 0  |    | 45 | 60 |    | 90 |100 | 90 | 70 | 50 |    |    |
|    |    | 50 |    | 60 |    |    |    |    |    |    |    |
| 20 | 30 | 40 | 50 | 60 |    | 80 |    |    |    |    |    |
|    |    |    |    |    |    |    |    |    |    |    |    |
|    |    | 70 | 60 |    | 50 | 50 | 50 |    | 50 |    |    |
| 80 | 70 | 60 | 50 | 40 | 30 | 35 | 40 | 45 | 50 | 55 | 60 |

Fig. 6E

| 1 | 1 | 1 | 1 | 1 | 1 | 1 | 1 | 1 | 1 | 1 | 1 |
|---|---|---|---|---|---|---|---|---|---|---|---|
| 0 | 1 | 0 | 1 | 0 | 0 | 0 | 0 | 0 | 1 | 1 | 1 |
| 0 | 1 | 1 | 1 | 0 | 1 | 1 | 1 | 1 | 0 | 1 | 0 |
| 0 | 0 | 0 | 1 | 0 | 1 | 0 | 1 | 0 | 0 | 0 | 0 |
| 0 | 0 | 0 | 0 | 0 | 1 | 1 | 1 | 1 | 1 | 1 | 0 |
| 0 | 0 | 1 | 0 | 1 | 0 | 0 | 0 | 0 | 0 | 0 | 1 |
| 1 | 0 | 1 | 1 | 0 | 1 | 1 | 1 | 1 | 1 | 0 | 0 |
| 0 | 0 | 1 | 0 | 1 | 0 | 0 | 0 | 0 | 0 | 0 | 0 |
| 1 | 1 | 1 | 1 | 1 | 0 | 1 | 0 | 0 | 0 | 0 | 0 |
| 0 | 0 | 0 | 0 | 0 | 0 | 0 | 0 | 0 | 0 | 0 | 0 |
| 0 | 1 | 1 | 0 | 1 | 1 | 1 | 0 | 1 | 0 | 0 | 0 |
| 1 | 1 | 1 | 1 | 1 | 1 | 1 | 1 | 1 | 1 | 1 | 1 |

Fig. 6F

| 60 |    | 20 |    | 20 |    | 30 |    | 20 |    | 20 | 40 |
|----|----|----|----|----|----|----|----|----|----|----|----|
|    | 40 |    | 30 |    |    |    |    |    | 30 |    | 20 |
|    |    | 20 |    |    |    | 50 |    | 40 |    | 20 |    |
|    |    |    |    | 50 |    | 50 |    |    |    |    |    |
|    |    |    |    |    | 50 | 60 |    |    |    | 20 |    |
|    |    | 50 |    | 70 |    |    |    |    |    |    | 0  |
|    | 0  |    | 60 |    | 90 | 100| 90 |    |    |    |    |
|    |    | 50 |    | 60 |    |    |    |    |    |    |    |
| 20 |    |    |    |    |    | 80 |    |    |    |    |    |
|    |    |    |    |    |    |    |    |    |    |    |    |
|    | 70 |    |    |    |    |    |    |    |    |    |    |
| 80 |    |    |    | 30 |    |    |    |    |    |    | 60 |

Fig. 6G

| 1 | 0 | 1 | 0 | 1 | 0 | 1 | 0 | 1 | 0 | 1 | 1 |
|---|---|---|---|---|---|---|---|---|---|---|---|
| 0 | 1 | 0 | 1 | 0 | 0 | 0 | 0 | 0 | 1 | 0 | 1 |
| 0 | 0 | 1 | 0 | 0 | 0 | 1 | 0 | 1 | 0 | 1 | 0 |
| 0 | 0 | 0 | 0 | 0 | 1 | 0 | 1 | 0 | 0 | 0 | 0 |
| 0 | 0 | 0 | 0 | 0 | 1 | 1 | 0 | 0 | 0 | 1 | 0 |
| 0 | 0 | 1 | 0 | 1 | 0 | 0 | 0 | 0 | 0 | 0 | 1 |
| 1 | 0 | 0 | 1 | 0 | 1 | 1 | 1 | 0 | 0 | 0 | 0 |
| 0 | 0 | 1 | 0 | 1 | 0 | 0 | 0 | 0 | 0 | 0 | 0 |
| 1 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 |
| 1 | 0 | 0 | 0 | 0 | 1 | 0 | 0 | 0 | 0 | 0 | 1 |

Fig. 6H

| 60 |    | 20 |    | 20 |    | 30 |    | 20 |    | 20 | 40 |
|----|----|----|----|----|----|----|----|----|----|----|----|
|    | 40 |    | 30 |    |    |    |    |    | 30 |    | 20 |
|    |    | 20 |    |    |    | 50 |    | 40 |    | 20 |    |
|    |    |    |    |    | 50 |    | 50 |    |    |    |    |
|    |    |    |    |    | 50 | 60 |    |    |    | 20 |    |
|    |    | 50 |    | 70 |    |    |    |    |    |    | 0  |
|    | 0  |    | 60 |    | 90 | 100| 90 |    |    |    |    |
|    |    | 50 |    | 60 |    |    |    |    |    |    |    |
| 20 |    |    |    |    |    | 80 |    |    |    |    |    |
|    |    |    |    |    |    |    |    |    |    |    |    |
|    |    | 70 |    |    |    |    |    |    |    |    |    |
| 80 |    |    |    |    | 30 |    |    |    |    |    | 60 |

Fig. 7A

| 60 | 40 | 20 | 20 | 20 | 25 | 30 | 25 | 20 | 20 | 20 | 40 |
|---|---|---|---|---|---|---|---|---|---|---|---|
|  | 40 |  | 30 |  |  |  |  |  | 30 | 25 | 20 |
|  |  | 20 |  |  |  | 50 | 45 | 40 | 30 | 20 |  |
|  |  |  |  | 50 |  | 50 |  |  |  |  |  |
|  |  |  |  | 50 | 60 | 50 | 40 | 30 | 20 |  |  |
|  |  | 50 |  | 70 |  |  |  |  |  |  | 0 |
| 0 |  |  | 60 |  | 90 | 100 | 90 |  |  |  |  |
|  |  | 50 |  | 60 |  |  |  |  |  |  |  |
| 20 | 30 | 40 | 50 | 60 | 70 | 80 |  |  |  |  |  |
|  |  |  |  |  |  |  |  |  |  |  |  |
|  | 70 |  |  |  |  |  |  |  |  |  |  |
| 80 | 70 | 60 | 50 | 40 | 30 | 35 | 40 | 45 | 50 | 55 | 60 |

Fig. 7B

| 1 | 0 | 1 | 0 | 1 | 0 | 1 | 0 | 1 | 0 | 1 | 1 |
|---|---|---|---|---|---|---|---|---|---|---|---|
| 1 | 1 | 1 | 1 | 1 | 0 | 1 | 0 | 1 | 1 | 0 | 1 |
| 1 | 0 | 1 | 0 | 1 | 0 | 1 | 0 | 1 | 0 | 1 | 1 |
| 1 | 0 | 1 | 0 | 1 | 1 | 1 | 1 | 0 | 0 | 0 | 1 |
| 1 | 0 | 0 | 0 | 1 | 1 | 1 | 0 | 0 | 0 | 1 | 1 |
| 1 | 0 | 1 | 1 | 1 | 1 | 1 | 1 | 1 | 0 | 1 | 1 |
| 1 | 1 | 0 | 1 | 1 | 1 | 1 | 1 | 0 | 0 | 0 | 1 |
| 1 | 0 | 1 | 0 | 1 | 1 | 1 | 1 | 1 | 0 | 1 | 1 |
| 1 | 0 | 0 | 0 | 0 | 0 | 1 | 0 | 0 | 0 | 0 | 1 |
| 1 | 1 | 0 | 1 | 0 | 0 | 1 | 0 | 0 | 0 | 0 | 1 |
| 1 | 1 | 0 | 1 | 0 | 0 | 0 | 0 | 0 | 0 | 0 | 1 |
| 1 | 0 | 0 | 0 | 0 | 1 | 0 | 0 | 0 | 0 | 0 | 1 |

Fig. 7C

| 60 | 40 | 20 | 20 | 20 | 25 | 30 | 25 | 20 | 20 | 20 | 40 |
|---|---|---|---|---|---|---|---|---|---|---|---|
| 50 | 40 | 20 | 30 | 30 |    | 40 | 35 | 30 | 30 | 25 | 20 |
| 40 |    | 20 |    | 40 |    | 50 | 45 | 40 | 30 | 20 | 15 |
| 30 |    | 30 |    | 50 | 50 | 55 | 50 | 40 | 30 | 20 | 10 |
| 20 |    | 40 |    | 60 | 50 | 60 | 50 | 40 | 30 | 20 | 5 |
| 10 |    | 50 |    | 70 | 70 | 80 | 70 |    |    | 25 | 0 |
| 0 |    |    | 60 | 65 | 90 | 100 | 90 |    |    | 30 | 10 |
| 10 |    | 50 | 55 | 60 | 80 | 90 | 80 |    |    | 35 | 20 |
| 20 | 30 | 40 | 50 | 60 | 70 | 80 | 70 |    |    | 40 | 30 |
| 40 | 50 |    | 50 |    |    | 60 |    |    |    | 45 | 40 |
| 60 | 70 |    | 50 |    |    | 50 |    |    |    | 50 | 50 |
| 80 | 70 | 60 | 50 | 40 | 30 | 35 | 40 | 45 | 50 | 55 | 60 |

Fig. 7D

| 1 | 1 | 1 | 1 | 1 | 1 | 1 | 1 | 1 | 1 | 1 | 1 |
|---|---|---|---|---|---|---|---|---|---|---|---|
| 0 | 1 | 0 | 1 | 0 | 0 | 0 | 0 | 0 | 1 | 1 | 1 |
| 0 | 1 | 1 | 1 | 0 | 1 | 1 | 1 | 1 | 0 | 1 | 0 |
| 0 | 0 | 0 | 1 | 0 | 1 | 0 | 1 | 0 | 0 | 0 | 0 |
| 0 | 0 | 0 | 0 | 0 | 1 | 1 | 1 | 1 | 1 | 1 | 0 |
| 0 | 0 | 1 | 0 | 1 | 0 | 0 | 0 | 0 | 0 | 0 | 1 |
| 1 | 0 | 1 | 1 | 0 | 1 | 1 | 1 | 1 | 1 | 0 | 0 |
| 0 | 0 | 1 | 0 | 1 | 0 | 0 | 0 | 0 | 0 | 0 | 0 |
| 1 | 1 | 1 | 1 | 1 | 0 | 1 | 0 | 0 | 0 | 0 | 0 |
| 0 | 0 | 0 | 0 | 0 | 0 | 0 | 0 | 0 | 0 | 0 | 0 |
| 0 | 1 | 1 | 0 | 1 | 1 | 1 | 0 | 1 | 0 | 0 | 0 |
| 1 | 1 | 1 | 1 | 1 | 1 | 1 | 1 | 1 | 1 | 1 | 1 |

Fig. 7E

| 60 | 40 | 20 | 20 | 20 | 25 | 30 | 25 | 20 | 20 | 20 | 40 |
|----|----|----|----|----|----|----|----|----|----|----|----|
| 50 | 40 | 20 | 30 | 30 | 35 | 40 | 35 | 30 | 30 | 25 | 20 |
| 40 | 30 | 20 | 30 | 40 | 45 | 50 | 45 | 40 | 30 | 20 | 15 |
| 30 | 30 | 30 | 40 | 50 | 50 | 55 | 50 | 40 | 30 | 20 | 10 |
| 20 | 30 | 40 | 50 | 60 | 50 | 60 | 50 | 40 | 30 | 20 | 5 |
| 10 |    | 50 |    | 70 | 70 | 80 | 70 |    |    | 25 | 0 |
| 0  |    |    | 60 | 65 | 90 | 100| 70 |    |    | 30 | 10 |
| 10 | 30 | 50 | 55 | 60 | 80 | 90 | 80 | 65 | 50 | 35 | 20 |
| 20 | 30 | 40 | 50 | 60 | 70 | 80 | 70 | 60 | 50 | 40 | 30 |
| 40 | 50 | 50 | 50 |    |    |    | 60 | 55 | 50 | 45 | 40 |
| 60 | 70 | 60 | 50 | 50 | 50 | 50 | 50 | 50 | 50 | 50 | 50 |
| 80 | 70 | 60 | 50 | 40 | 30 | 35 | 40 | 45 | 50 | 55 | 60 |

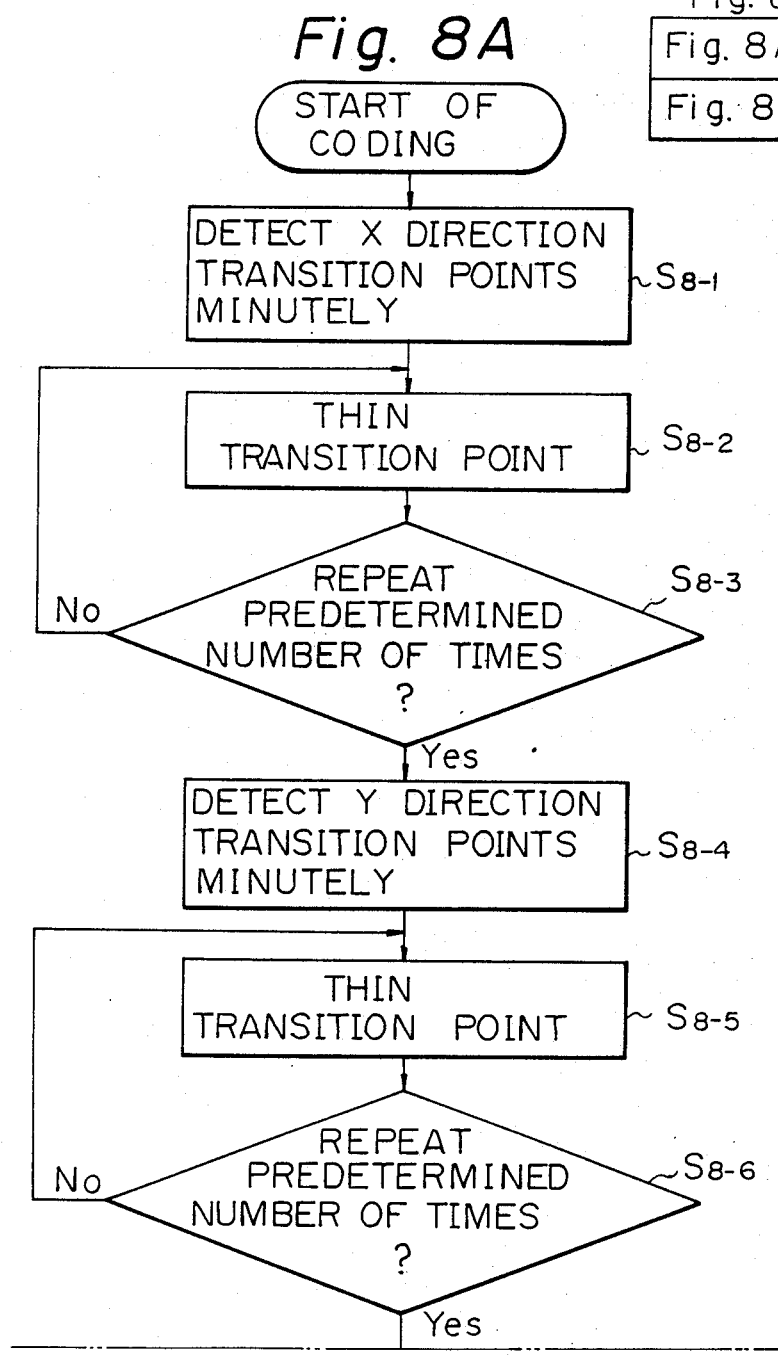

| a | b | c | c' |
|---|---|---|----|
| d | e | f | f' |
| g | h | i | i' |

METHOD OF COMPRESSING HALFTONE IMAGE DATA

BACKGROUND OF THE INVENTION

The present invention relates to a method of compressing halftone image data applicable to an electronic publishing system, fasimile transmission system, telephone with a display, videotex, image filing system, etc.

A problem with an electronic publishing system, for example, is that a photograph or similar image having gradations, i.e., a natural image containing halftone is far greater than characters or two-level images with respect to the amount of data and is therefore not feasible for a filing or similar purpose. This problem may be eliminated by dividing an image into lines and compressing gradients along the lines, as disclosed in Japanese Laid-Open Patent Publication No. 62-135073. This kind of approach, however, does not give any consideration to the correlation in the direction perpendicular to the lines. Considering a vertical stripe pattern, for example, the compression efficiency attainable with the disclosed approach is poor, while decreasing the amount of codes aggravates the image quality.

SUMMARY OF THE INVENTION

It is therefore an object of the present invention to provide a method of recording halftone image data by compressing them and reconstructing the compressed data.

It is another object of the present invention to provide a generally improved method of compressing halftone image data.

In accordance with the present invention, a method of compressing data representative of a halftone image comprises the steps of (a) scanning input two-dimensional data representative of a halftone image in one coordinates direction and the other coordinates direction which is perpendicular to the one coordinates direction, (b) determining a transition pattern representative of transition points where a difference between densities of individual pixels changes, with respect to the one coordinates direction, (c) determining a transition pattern with respect to the other coordinates direction, and (d) coding densities of pixels associated with coordinates where AND of the two transition patterns is satisfied, the transition pattern of the one coordinates direcction, and the transition pattern of the other coordinates direction.

Also, in accordance with the present invention, a method of compressing data representative of a halftone image comprises the steps of (a) scanning input two-dimensional data representative of a halftone image in one coordinates direction, (b) determining a transition pattern representative of transition points where a difference between densities of individual pixels changes as determined by step (a), with respect to the one coordinates direction, (c) scanning the data in the other direction which is perpendicular to the one coordinates direction, (d) determining a transition pattern representative of transition points where a difference between densities of individual pixels changes as determined by step (c), with respect to the other coordinates direction, (e) determining a vector interconnecting pixels which are closely correlated in the one coordinates direction, on the basis of the transition patterns, and (f) coding the vector only.

Further, in accordance with the present invention, a method of compressing data representative of a halftone image comprises the steps of (a) scanning input two-dimensional data representative of a halftone image in one coordinates direction, (b) determining a transition pattern representative of transition points where a difference between densities of individual pixels changes as determined by step (a), with respect to the one coordinates direction, (c) scanning the data in the other direction which is perpendicular to the one coordinates direction, (d) determining a transition pattern representative of transition points where a difference between densities of individual pixels changes as determined by step (c), with respect to the other coordinates direction, (e) when a pixel is to be thinned by using the transition patterns, calculating a thinning error with respect to the original image, and (f) determining whether or not to thin the pixel on the basis of the calculated thinning error.

Further, in accordance with the present invention, a method of compressing data representative of a halftone image comprises the steps of (a) removing fluctuations minute data due to noise and other similar causes while substantially preventing important information including edges of input image data from being effected, (b) scanning in one coordinates direction the data from which fluctuations have been removed, (c) determining a transition point patten representative of transition points where a difference between densities of individual pixels changes as determined by step (b), with respect to the one coordinates direction, (d) scanning the data in the other direction which is perpendicular to the one direction, (e) determining a transition point pattern representative of transition points where a difference between densities of individual pixels changes as determined by step (d), with respect to the other coordinates direction, and (f) coding only a vector interconnecting pixels which are closely correlated in the one coordinates direction, on the basis of the transition point patterns.

BRIEF DESCRIPTION OF THE DRAWINGS

The above and other objects, features and advantages of the present invention will become more apparent from the following detailed description taken with the accompanying drawings in which:

FIGS. 6A to 6H show patterns representative of specific changes of codes which occur during the coding operation of the first embodiment;

FIGS. 7A to 7E show patterns representative of specific changes of codes which occur during the decoding operation of the first embodiment;

DESCRIPTION OF THE PREFERRED EMBODIMENTS

Preferred embodiments of the method in accordance with the present invention will be described hereinafter with reference to the accompanying drawings.

First Embodiment

Figure 1A:
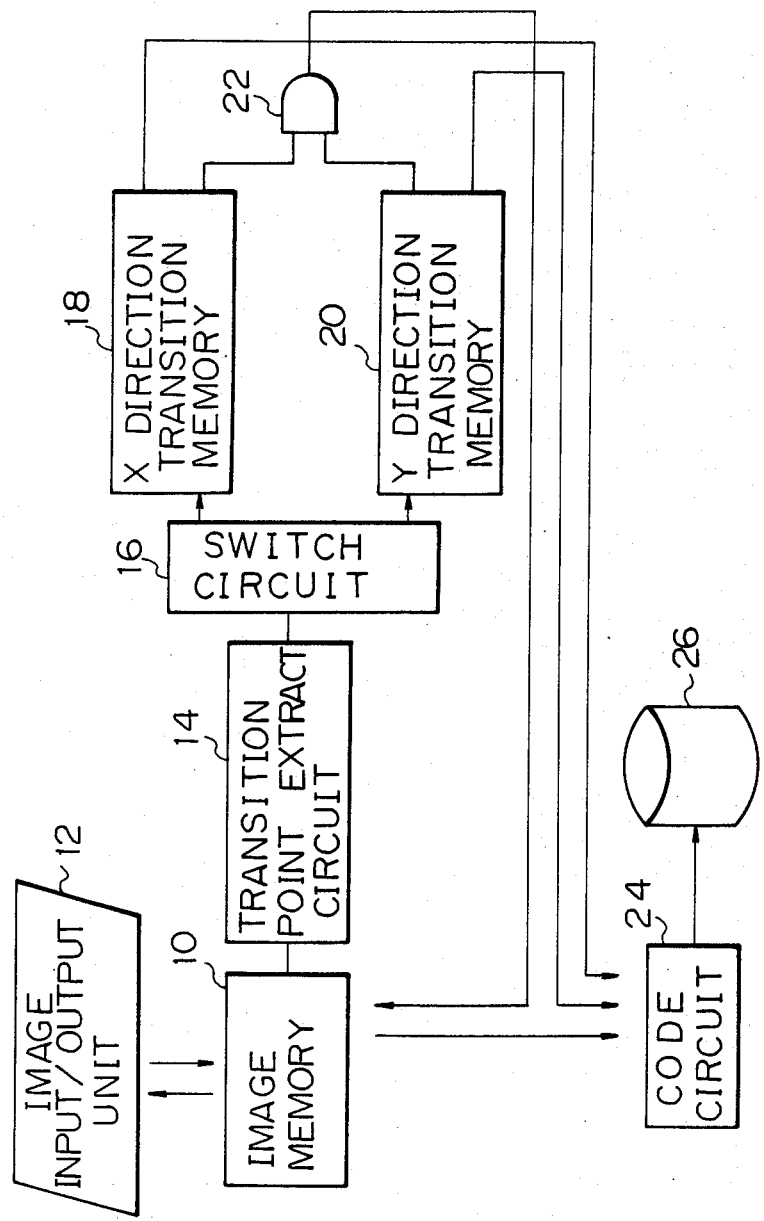
FIG. 1A is a schematic block diagram of hardware for practicing a data compressing method which is representative of a first embodiment of the present invention.

Referring to FIG. 1A of the drawings, a hardware construction for practicing a halftone image data compressing method of the present invention is shown in a schematic block diagram. In the figure, an image memory 10 is connected to a printer, scanner or similar image inputting or outputting unit 12. A transition point extracting circuit 14 determines a correlation of an image in the x direction on the basis of image data stored in the memory 10, as described hereinafter. Based on the determined correlation, the circuit 14 operates a switching circuit 16 so that a pattern representative of transition points in the x direction correlation, i.e., (logical) ONEs representative of such transition points are written in an x direction transition memory 18.

Figure 2:
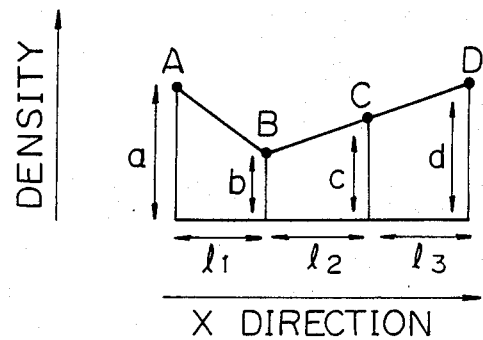
FIGS. 2 and 3 plot a specific relationship between the density and the direction in an image.

How to determine the correlation of an image by arithmetic operations is as follows. Assuming that the image density varies in the x direction as shown in FIG. 2, then the amounts of variation of density are calculated with respect to consecutive pixels A, B, C and D of a halftone image, by equations:

$$\Delta b = (a-b)/l_1 \qquad \text{Eq. (1)}$$

$$\delta c = (b-c)/l_2 \qquad \text{Eq. (2)}$$

Based on the results of Eqs. (1) and (2), a difference $\Delta B$ between the amounts of density variation is determined by:

$$\Delta B = |\Delta b - \Delta c| \qquad \text{Eq. (3)}$$

Figure 3:
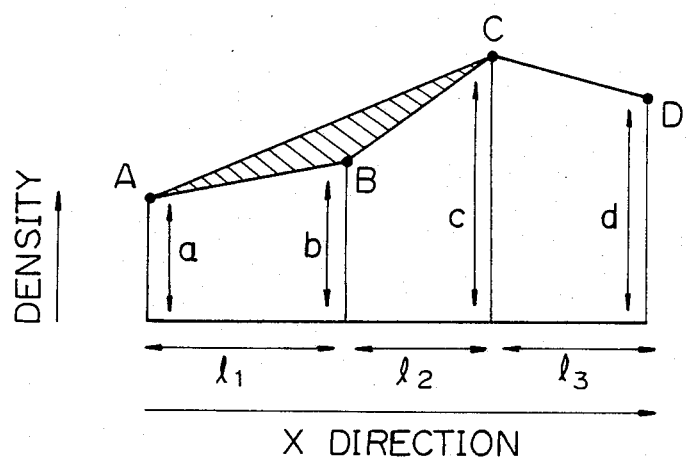

On the other hand, assuming density variations in the x direction which has density transition points A, B, C and D, as shown in FIG. 3, whether or not to omit the transition point B is determined by using an integrated value of thinning errors. If the integrated value is smaller than a predetermined reference value, the point B is omitted. Such a decision is also performed with the other transition points A, C and D. More specifically, the decision is made on the basis of a difference (indicated by hatching in the figure) between the sum of the integrated value associated with the section between the points A and B and the sum of the integrated value associated with the section between the points B and C, and the integrated value associated with the section between the points A and C. The thinning error $\epsilon$ is produced by:

$$\epsilon = \{(a + b) \times (l_1 + l_2)\} - \\ \{(a + b) l_1 + (b + c) \times l_2\} \qquad \text{Eq. (4)}$$

As stated above, the difference $\Delta B$ between the amounts of density variation is calculated by using the Eq. (3) so as to detect a minute point of density transition. Then, when the transition point is to thinned by using the Eq. (4), a thinning error $\epsilon$ is calculated and, if it is smaller than a predetermined threshold, the transition point is thinned. This is repeated a predetermined number of times to detect transition points in the x direction, whereby a transition point pattern in which ONEs are assigned to the coordinates that are associated with the transition point is produced. The resulting pattern is written in the x direction transition memory 5. Likewise, a correlation in the y direction is determined and then stored in a y direction transition memory 20 (FIG. 1A). Thereafter, an AND gate 22 produces coordinates where AND of the x direction and y direction transition patterns is a ONE, and then density values of the coordinates associated with the image memory 10 are fed to a coding circuit 24 to be coded thereby. Further, the x direction and y direction transition patterns are also fed to the coding circuit 24 to be coded thereby. In this manner, a great amount of halftone data are compressed and then stored in a recording unit 26.

Figure 1B:
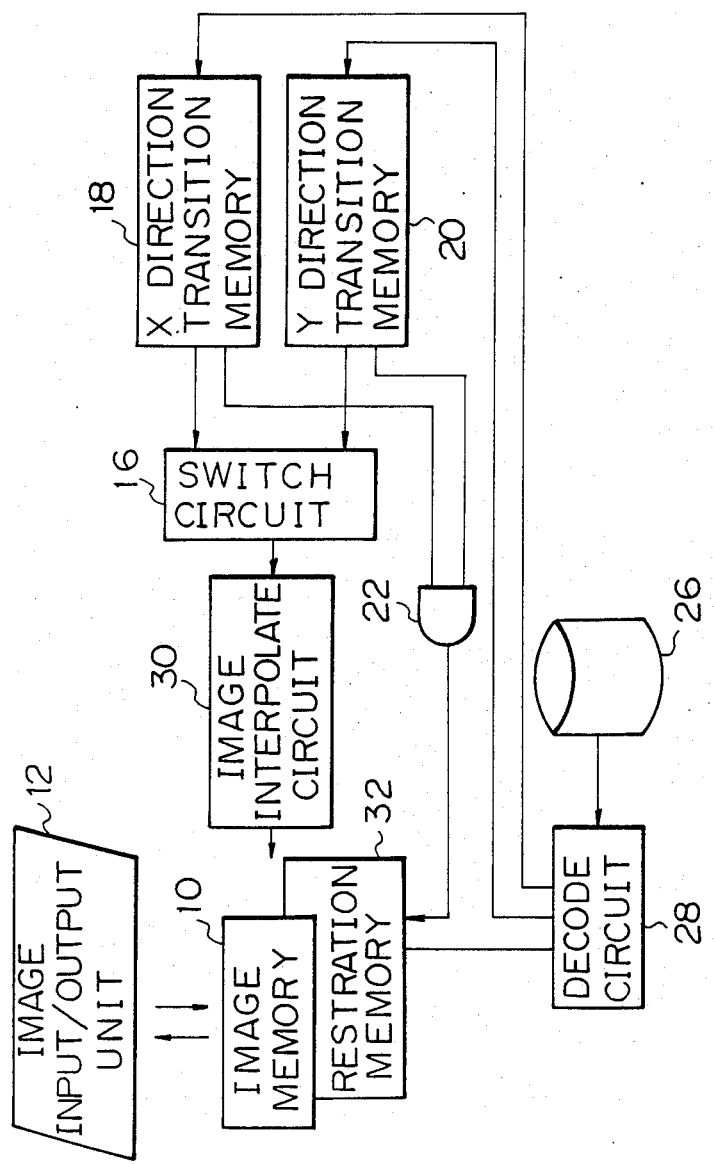
FIG. 1B is a schematic block diagram of hardware for practicing a data reconstructing or restoring method associated with the method of FIG. 1A.

FIG. 1B shows a hardware construction for reconstructing or decompressing the image data which have been compensated by the hardware of FIG. 1A as discussed above. As shown, a decoding circuit 28 decodes the coded data being stored in the recording unit 26 to reproduce the x direction and y direction transition patterns. The x direction and y direction transition patterns are written in the x direction transition memory 18 and the y direction transition memory 20, respectively. The AND gate 22 produces coordinates where AND is a ONE, and then the densities produced by the decoding circuit 28 are written in the associated coordinates of the image memory 10. This is followed by interpolation which is performed by an image interpolating circuit 30 on the basis of the decoded densties. Specifically, the interpolating circuit 30 interpolates in the x direction only the pixels which can be interpolated, by referencing the data stored in the x direction transition memory 18 and data stored in a restoration memory 32 which are indicative of restored/non-restored. Further, the switching circuit 16 is operated to interpolate the pixels in the y direction on the basis of the data being stored in the y direction transition memory 20 and restoration memory 32. Such a procedure is repeated in the x and y directions alternately until further interpolation becomes impossible. Finally, the pixels left non-interpolated are interpolated in the x direction.

Figure 4:
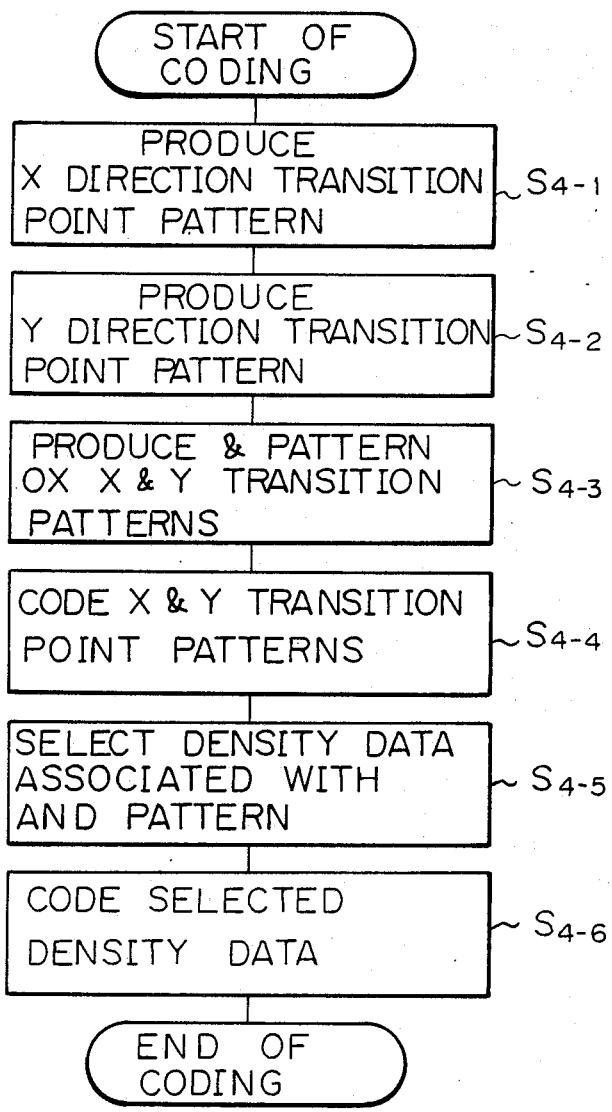
FIGS. 4 and 5 are flowcharts demonstrating respectively the coding and decoding operations of the circuitry shown in FIGS. 1A and 1B.

FIG. 4 is a flowchart demonstrating the coding procedure.

The routine shown in the figure begins with a step S4-1 for loxating coordinates where the difference between densities in the x direction changes and assigning ONEs (black) to an x direction transition point pattern which is associated with such coordinates. A similar procedure is executed in the y direction to produce a y direction transition point pattern (S4-2). This is followed by a step S4-3 for preparing an AND pattern in which the ANDs of the two different transition point patterns are ONEs (black). The pixels which are ONEs in the AND pattern are representative of the characteristic density of the image. Concerning the other pixels, it is considered that their densities can be calculated at the time of decoding. Then, the x direction and y direction transition point patterns are individually coded (S4-4). Further, the differences between density data which are associated with ONEs of the AND pattern are converted into Huffman codes (S4-5). The resulting codes are treated as compressed data representative of the image (S4-6).

The conditions for coding discussed above may be summarized as follows:

(1) each packet begins with a black run length;

(2) when the first black run length in a packet is a (logical) ZERO, the next white run length is representative of a blank;

(3) when the sum of white and black run lengths in a packet is smaller than the image size x (with a NEXT packet code), the next packet is considered as lying on the same line;

(4) in the decoding of the transition patterns, the processing is completed by decoding up to the line which is equal to the image size y;

(5) the total number of data in the density data portion is equal to the total number of black run lengths of the transition pattern portion; and (6) among the data in the density data portion, only the first data is the actual density data while, for the second and successive data, differences in density between the consecutive density values are coded.

Figure 5:
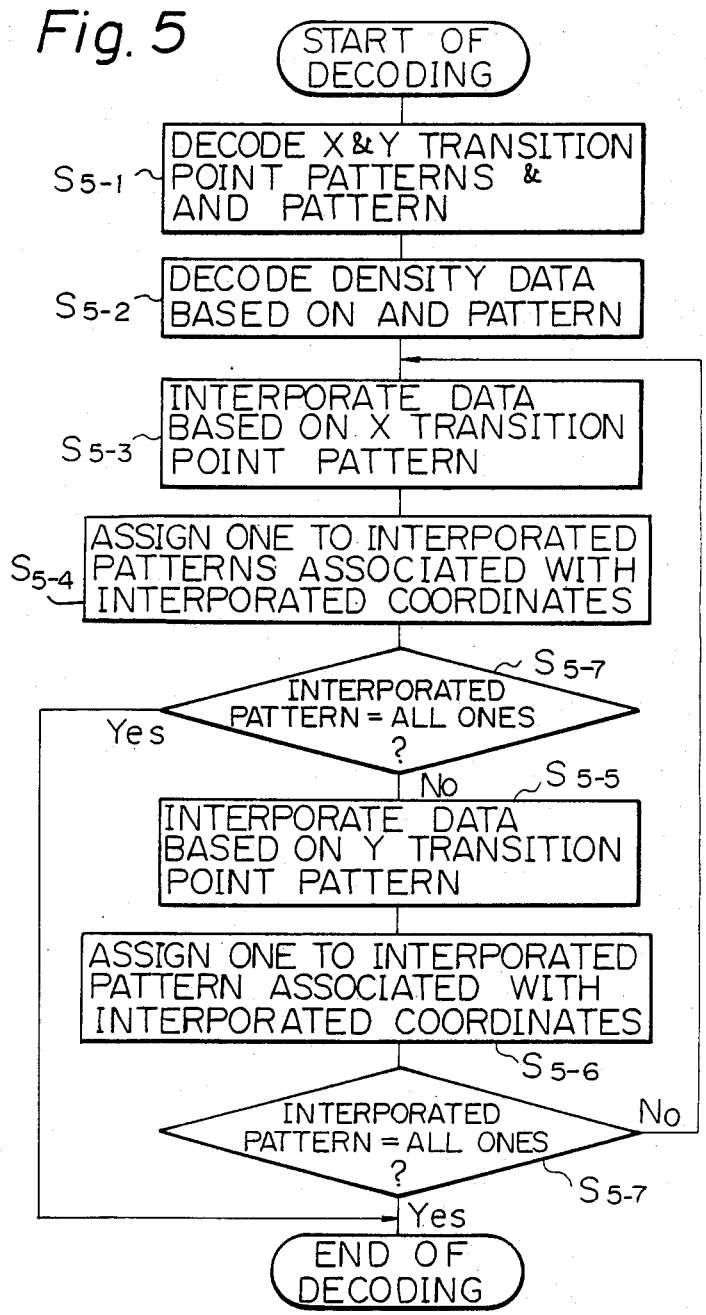

FIG. 5 indicates the decoding procedure in a flowchart. As shown, the transition point patterns, i.e., the AND pattern, x direction transition point pattern and y direction transition point pattern are individually decoded first (S5-1). Specifically, the AND pattern is produced by decoding the black and white run lengths of the transition pattern as they are and decoding the blank run lengths in the same manner as the white run lengths. The x direction transition point pattern is produced by decoding the blank lengths in the same manner as the black run lengths. The step S5-1 is followed by a step S5-2 for producing EXORs (Exclusive-ORs) of the AND pattern and x direction transition point pattern and inverting the resulting EXOR pattern to produce the y direction transition point pattern. Data are interpolated on the basis of such transition point patterns. The AND pattern is also used as an interpolated pattern associated with the pixels which have been decoded and interpolated.

The data interpolation is performed as follows. First, the pixels which can be interpolated by x direction interpolation only are detected and then interpolated (S5-3) while a flag is set in the above-mentioned interpolated pattern (S5-4). Subsequently, the pixels which can be interpolated by y direction interpolation only are detected and then interpolated (S5-5) while a flag is set in the interpolated pattern. Further, among the pixels which could not be interpolated in the x direction last time, the pixels which can be interpolated by using the pixels successfully interpolated are detected and then interpolated. This procedure is repeated in the y and x directions. Then, whether or not the interpolated pattern has become all ONEs, meaning that the interpolation is completed, is determined (S5-7). If the answer of the step S5-7 is YES, all the signal processing operations are ended.

Figures 6A, 6B:
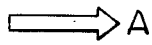

Referring to FIGS. 6A and 6B, a specific example of transitions which may occur in the coding of an original image is shown. First, as shown in FIG. 6A, the original image is scanned in the x direction (as indicated by an arrow A in the figure) so as to determine the transition points of correlation by, for example, a vector algorithm (FIG. 6B). Then, an x direction transition point pattern $A_{x,y}$ in which a ONE is assigned to each of the coordinates associated with those of the transition points is prepared (FIG. 6C). Likewise, the original image is scanned in the y direction (as indicated by an arrow B in the figure) to determine the densities at the transition points in the y direction (FIG. 6D), whereby a y direction transition point pattern $B_{x,y}$ is prepared (FIG. 6E). Then, an AND pattern of two different transition patterns $A_{x,y}$ and $B_{x,y}$ is produced (FIG. 6F), and differences between density data (FIG. 6G) which are associated with the AND pattern are coded (FIG. 6H). Further, the AND pattern is coded by taking account of the x and y direction transition transition patterns.

The coded data produced by the above procedure are decoded by using a suitable code data format to thereby reproduce the image. This decoding operation will be described in relation to a specific example shown in FIGS. 7A to 7E.

The size of an image to be decoded is determined by referencing the header of coded data. The codes in the transition point pattern portion are decoded to the determined size so as to produce an AND pattern (FIG. 7). Simultaneously, an x direction transition point pattern (FIG. 7B) is produced by taking the blank run lengths into account. These patterns are processed to produce a y direction transition point pattern (FIG. 7D). Further, the densities of the density data portion of the coded data are decoded to the pixels which are associated with the AND pattern.

Figure 8B:
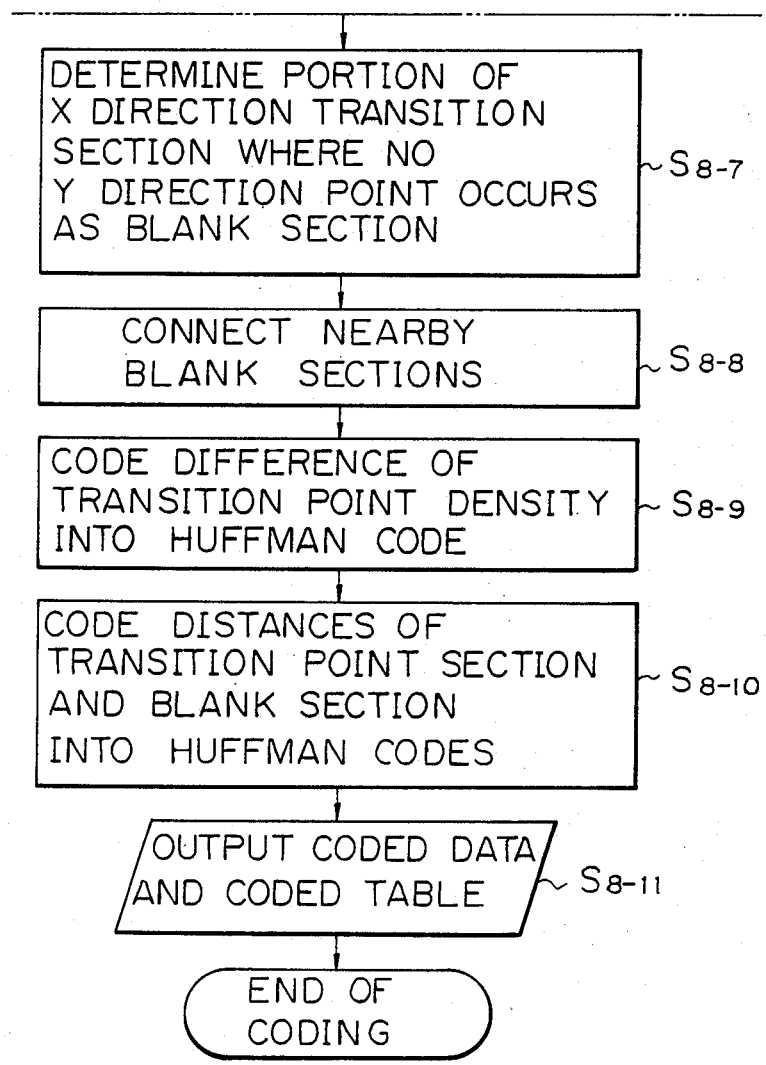
FIG. 8 is a flowchart representative of a modification to the coding procedure.

Referring to FIG. 8, a modification to the coding procedure of the illustrative embodiment is shown. In the coding procedure previously described with reference to FIG. 4, the densities associated with the coordinates where the AND condition of the x direction and y direction transition point patterns is satisfied are coded. In contrast, the modified procedure of FIG. 8 is such that, in a transition pattern associated with one direction, the portions where a transition point in the other direction does not exist are treated as blank sections, the nearby blank sections are interconnected, and the distance between the blank section and the transition point section is coded, with no regard to the above-mentioned AND condition.

Specifically, the procedure shown in FIG. 8 begins with a step S8-1 for determining a density transition point in one direction (x direction) in terms of a difference between the amounts of density variation by using the Eq. (3). This is followed by a step S8-2 in which an error particular to thinning is calculated by using the Eq. (4) and, when the thinning error is less than a threshold, the density transition point is thinned. These steps are repeated a predetermined number of times (S8-3) to detect transition points in the x direction. The same sequence of steps is performed in the y direction to detect transition points in the y direction (S8-4, S8-5 and S8-6). Concerning the transition points in the y direction, only the coordinates thereof are used. Whether or not the transition point in the direction y occurs even once between a certain transition point and the next transition point in the direction x is examined. The section between nearby x direction transition points where the y direction transition point does not appear at all is determined to be the section which can be reconstructed by y direction interpolation, and it is treated as a blank section (S8-7). This operation is repeated with all of the x direction transition points, and all of the consecutive blank sections are connected to each other (S8-8) to produce a single blank section. The density data, the length of the transition point section, and the length of the blank section are individually coded by the Huffman coding principle (S8-9 and S8-10). The density data are coded on a line basis by using the preceding value as an estimated value and coding the estimation error. The coded data and coding table are outputted for a recording or transmitting purpose (S8-11). To enhance efficient coding, the coding table is transmitted in the form of stepwise variable length codes (one byte, two bytes and four bytes).

Interpolation is performed by using the above data, in the x direction first. The pixels which can be interpolated by using the x direction transition points shown in FIG. 7B are interpolated by using an equation shown below (FIG. 7A). Assuming that a density to be determined is $G_{x,y}$ and the correlated density is $G_{x-11,y}$, the interpolation equation is expressed as:

$$G_{x,y} = G_{x+l_2} + \frac{G_{x-l_1,y} - G_{x+l_2,y}}{l_1 + l_2} \times l_2$$

Then, interpolation in the y direction is performed (FIG. 7C). These two consecutive steps are repeated until all the pixels have been interpolated.

Assuming that the value of a transition point pattern in the interpolating direction is $A_{x,y}$ and the value of an interpolated pattern indicative of "decoded" and "interpolated" as previously stated is $B_{x,y}$, then the conditions of density which can be interpolated are as follows:

(1) At the coordinates of a density to be decoded, $A_{x,y}=0$ holds;

(2) When the interpolating direction is x,
 [A] if the minimum m which satisfies conditions m>0 and $(A_{x-m, y} \cup b_{x-m, y})=1$ exists, $(A_{x-m, y}=1) \cap (B_{x-m, y}=0)$ does not hold, and
 [B] if the minimum value n which satisfies conditions n> 0 and $(A_{x+n, y} \cup b_{x+n, y})=1$ exists, $(A_{x+n, y}=1) \cap (B_{x+n, y}=0)$ does not hold. In the two cases [A] and [B], $A \cap B$ is true;

(3) When the interpolating direction is y,
 [A] if the minimum m which satisfies conditions m>0 and $(A_{x, y-m} \cup b_{x, y-m})=1$ exists, $(A_{x, y-m}=1) \cap (B_{x, y-m}=0)$ does not hold, and
 [B] if the minimum n which satisfies conditions n>0 and $(A_{x, y+n} \cup b_{x, y+n})=1$ exists, $(A_{x, y+n}=1) \cap (B_{x, y+n}=0)$ does not hold. In the two cases [A] and [B], $A \cap B$ is true.

As stated above, in the illustrative embodiment, halftone image data are coded by thinning while taking account of the correlation of x direction images and the correlationship of y direction images, and they are decoded by interpolation on the basis of the x and y correlations. This increases the compression efficiency and thereby enhances images quality.

SECOND EMBODIMENT

Figure 9:
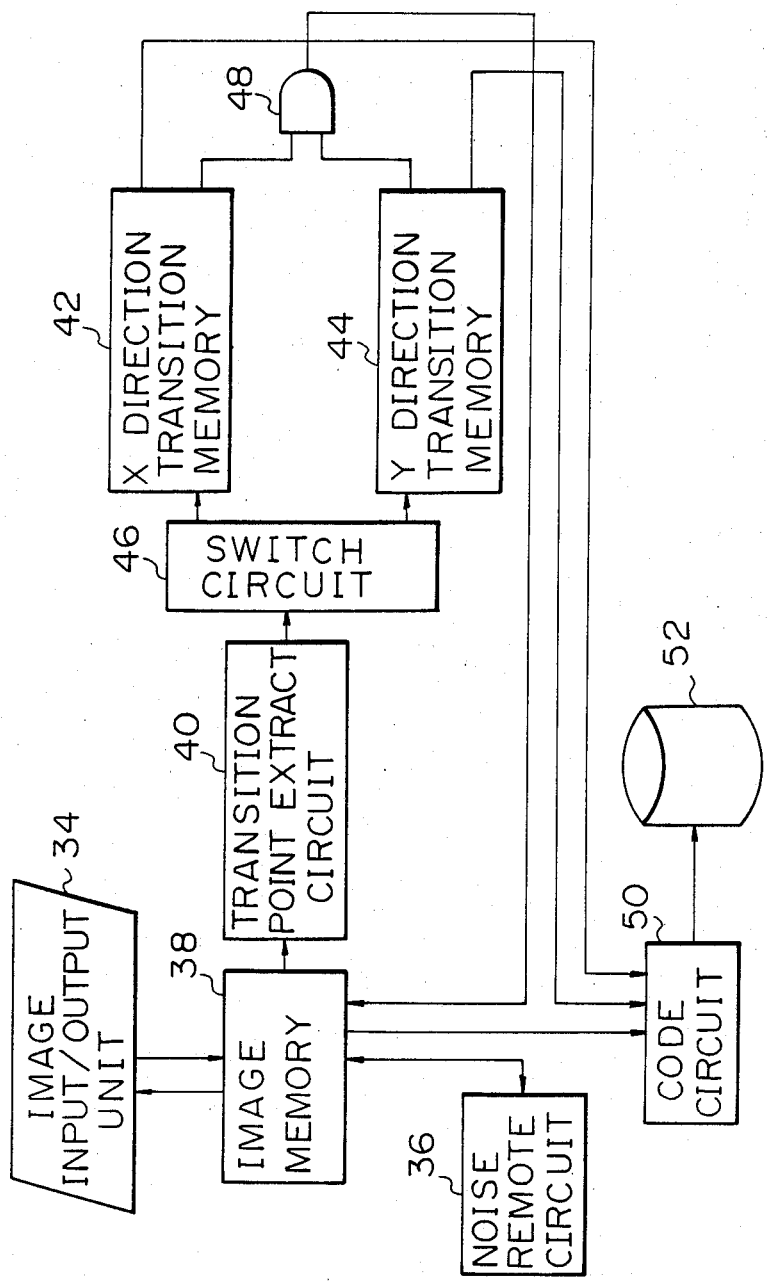
FIG. 9 is a schematic block diagram of hardware for practicing a data compressing method which is representative of a second embodiment of the present invention.

FIG. 9 shows an hardware construction for practicing an alternative embodiment of the present invention is shown. With the construction of FIG. 1A, it may occur that when the image data produced by the inputting unit 12 involves isolated point noise, the compression ratio does not increase and/or the noise is emphasized. The alternative construction FIG. 9 is free from such an occurrence. In the figure, an image inputting or outputting unit 34 inputs or outputs an image having gradations. A noise removing circuit 36 removes the fluctuation of minute data ascribable to noise and other causes from the screen without noticeably effecting edges and other important information. An image memory 38 stores the image inputted from the inputting unit 34 and the image from which noise has been removed. A transition point extracting circuit 40 detects the points where the difference of density undergoes a change. An x direction transition memory 42 stores the positions where the density changes in the x direction, while a y direction transition memory 44 stores the positions where the density changes in the y direction. There are further shown in FIG. 9 a switching circuit 46, an AND gate 48, a coding circuit 50 for transforming the densities and distances of the density transition poins into Huffman codes, and a recording unit 52 for recording the coded image data.

The compression which the illustrative embodiment performs is as follows. The image data produced by the image inputting or outputting unit 34 are stored in the image memory 38. The noise removing circuit 36 subjects the image data to median filter processing so as to store an image free from noise in the image memory 38. In principle, the algorithm of median filter processing is such that a median is determined by obtaining a histogram in a window area, but determining a histogram every time the window is shifted by one pixel is not efficient. In this particular embodiment, the hitogram is efficiently updated to enhance rapid processing. While applying a one-dimensional median filter to both of the row and column directions is another possible approach for rapid processing, the illustrative embodiment produces exactly the same results as would be produced by an original two-dimensional median filter. The algorithm particular to this embodiment will be outlined on the assumption that the window size is LX=LY=3.

Steps 1 to 4 which will be described are applied to one line and will be repeated to process the next line.

Figures 10, 11:
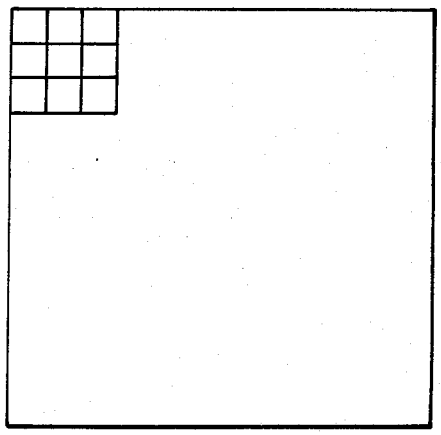
FIGS. 10 and 11 are views useful for understanding median filter processing particular to the second embodiment.

Step 1: In the first window (FIG. 10), a histogram is determined to find a median→MDN. Then, the pixels in the windown which have values smaller than the median are counted→LTMDN.

Step 2: the window is sifted to the right (FIG. 11) to update the histogram and LTMDN. Specifically, the count of histograms associated with the gray levels (hereinafter represented by gl(a), gl(d) and gl(g)) of pixels a, d and g is decremented:

hist [gl(a)]=hist[gl(a)]−1
hist [gl(d)]=hist [gl(d)]−1
hist [gl(g)]=hist [gl(g)]−1
LTMDN is updated as follows:

if gl(a)<MDN, LTMDN=LTMDN−1
is gl(d)<MDN, LTMDN=LTMDN−1
if gl(g)<MDN, LTMDN=LTMDN−1
Likewise, for pixels c', f' and i',
hist [gl(c')]=hist [gl(c')]+1
hist [gl(f')]=hist [gl(f')]+1
hist [gl(i')]=hist [gl(i')]+1
if gl(c')<MDN, LTMDN=LTMDN+1
if gl(f')<MDN, LTMDN=LTMDN+1
if gl(i')<MDN, LTMDN=LTMDN+1

Step 3: The median MDN in the immediately preceding window is updated to determine a median in the new window. Assume that [number of pixels in a window]/2 is ITH.

If $LTMDN > ITH$, (1)
$LTMDN = LTMDN - hist[MDN]$
$MDN = MDN - 1$
This is repeated until $LTMDN \leq ITH$ holds.

If $LTMDN \leq ITH$, (2)
$MDN = MDN + 1$
$LTMDN = LTMDN + hist[MDN]$

This is repeated until LTMDN+hist[MDN+1]>IHT holds.

The resulting MDN is the median in the current window, and it is substituted for JP.

Step 4: When one full line is completed, the operation ends; when otherwise, the operation returns to Step 2.

As stated above, the noise-free image stored in the image memory 38 is compressed by the same procedure as the procedure of the first embodiment. The compressed image is also reconstructed in the same manner as in the first embodiment.

THIRD EMBODIMENT

Figure 12:
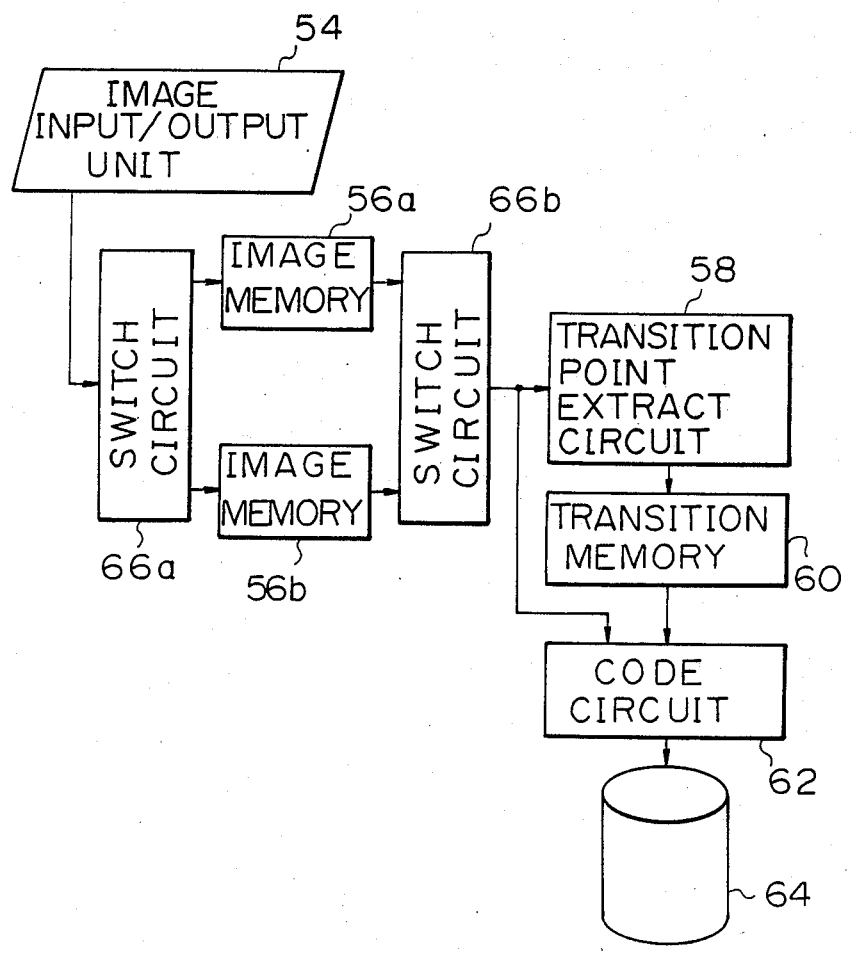
FIG. 12 is a schematic block diagram of hardware for practicing a data compressing method representative of a third embodiment of the present invention.
Figure 13:
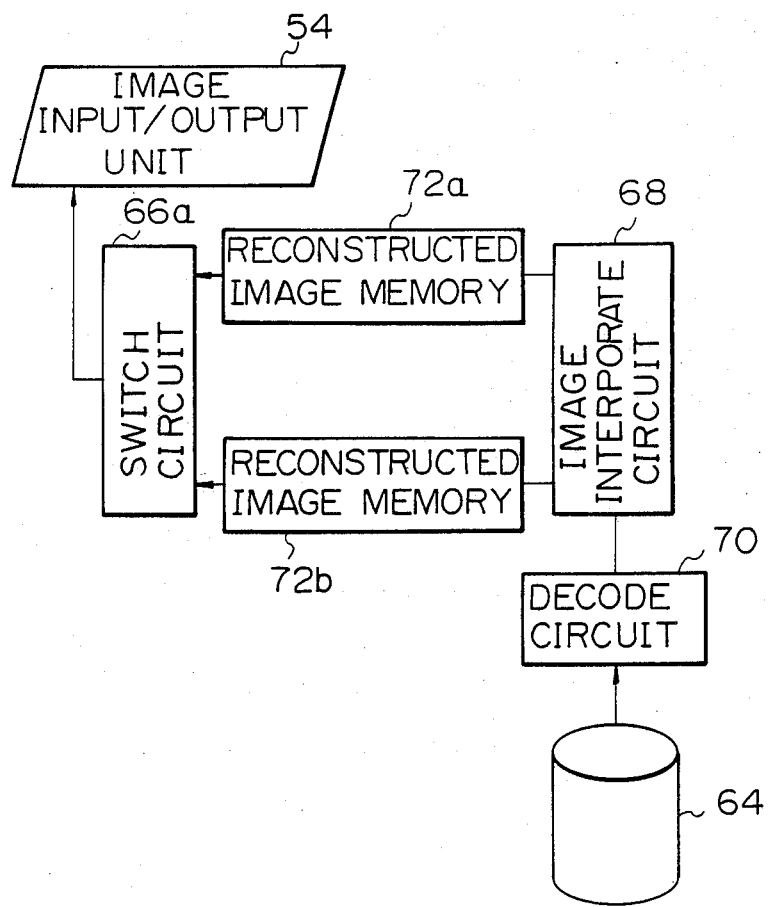
FIG. 13 is a schematic block diagram of hardware for practicing a data restoring method which is associated with the compressing method of FIG. 12.
Figure 14:
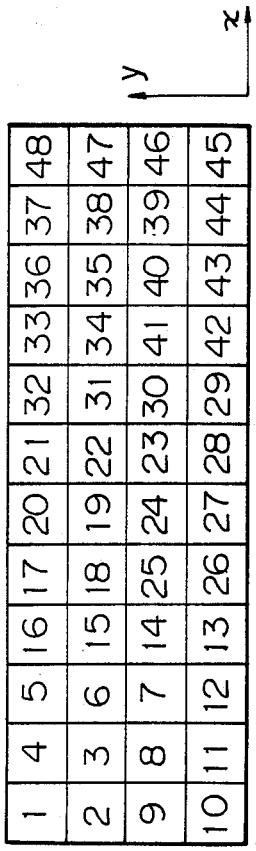
FIGS. 14 and 15 are views useful for understanding the scanning operations particular to the third embodiment.
Figure 15:
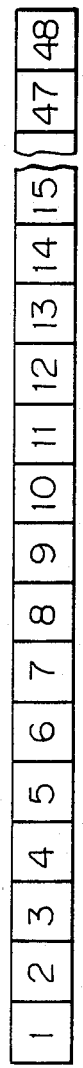
Figure 16:
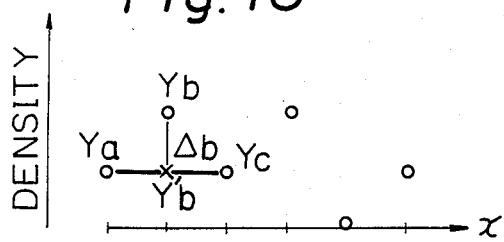
FIGS. 16, 17, 18 and 19 are plots demonstrating a fourth embodiment of the present invention.
Figure 17:
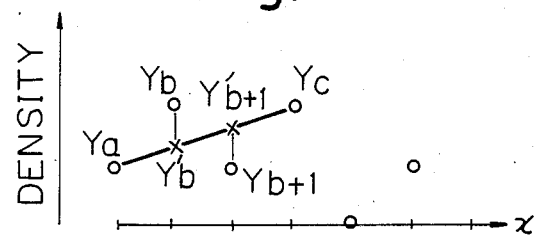
Figure 18:
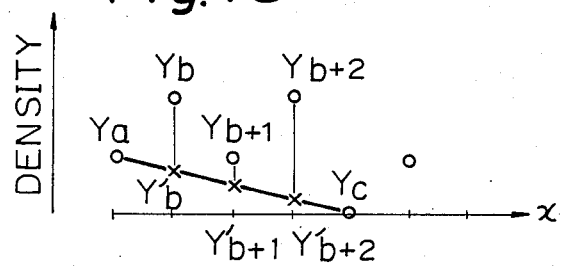
Figure 19:
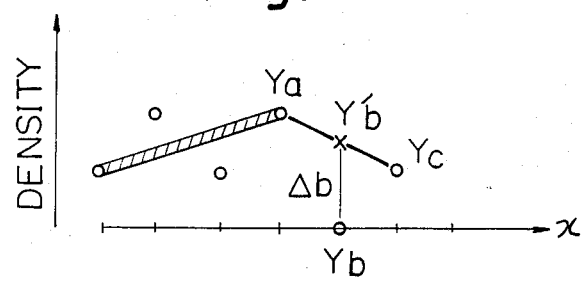

Referring to FIG. 12, a hardware construction for practicing a third embodiment of the present invention, particularly data compression, is shown. FIG. 13 shows a hardware construction for reconstructing data which have been compressed by the circuit of FIG. 12. In FIG. 12, an image inputting or outputting unit 54 reads or writes an image which involves halftone. Image memories 56a and 56b each stores several lines of image data entered by the image inputting unit 54. A transition point extracting circuit 58 detects the points where the difference of density undergoes a change. A transition memory 60 stores the positions of density transition points in a block. A coding circuit 62 codes the densities and distances of density transition points into Huffmand codes. A recording unit 64 records the coded image data. Labeled 66a and 66b are switching circuits. As shown in FIG. 13, the hardware for reconstructing compressed data is made up of the image inputting or ouputting unit 54, the switching circuit 66a, an image interpolating circuit 68, a decoding circuit 70, the recording unit 64, and decoded image memories 72a and 72b. In operation, the image memory 65a stores four lines of image data, for example, which are entered by the inputting unit 54. The image data stored in the memory 65a are scanned throughout the lines in the directions x and y as indicated by arrows in FIG. 14, whereby an elongate string of one-dimensional image data is produced, as shown in FIG. 15. Transition points where the density difference changes are extracted and connected to each other. Then, the differences and distances of of the transition points are converted into Huffman codes while, at the same time, succeeding video data are written in the other image memory 56b.

Such a procedure is repeated thereafter by switching the image memories 56a and 56b. Concerning the decoding operation, the hardware shown in FIG. 13 decodes the coded data by the Huffman decoding principle, and the transition points are reconstructed in the directions x and y shown in FIG. 14 on the basis of the densities and distances of transition points. The reconstructed transition points are interpolated by being treated in the form of an elongate string as shown in FIG. 15. The detection and thinning of transition points are implemented by the same procedures as in first embodiment. In this particular embodiment, four lines of video data are compressed and reconstructed by use of the image memories 56a, 56b, 72a and 72b and switching circuits 66a and 66b, so that image memories each having a relatively small capacity suffice.

As previously stated, the first embodiment determines whether or not to thin a transition point on the basis of a difference $\Delta B$ between the gradients $\Delta b$ and $\Delta c$ of vectors, as represented by the Eq. (3). With this kind of scheme, there is a fear that the thinning error differs from the pixel where the density noticeably changes to the pixels where the change is not noticeable, resulting in noise occurring in a restored image. A fourth embodiment which will be described includes an implementation for eliminating this problem.

FOURTH EMBODIMENT

Referring to FIGS. 16, 17, 18 and 19, there are plotted specific relationships between the image density and the direction which are useful for understanding a fourth embodiment of the present invention. In the figures, labeled $Y_a$, $Y_b$ and $Y_c$ are the image densities of pixels which are located at points a, b and c on the x axis, respectively. Assume that it has been already decided that the pixel $Y_a$ should be reserved. Then, whether or not to thin the pixel $Y_{a+1}$ is determined. Assume that b is equal to a+1 and c is equal to b+1, and that the pixel $Y_b$ is to be thinned.

Assuming that the thinning error is $\Delta b$, then $$\Delta c = (Y_c - Y_a)/(c-a)$$

$$Y'_b = Y_a + \Delta c(b-a)$$

Hence, $$\Delta b = |Y_b - Y'_b| \qquad \text{Eq. (5)}$$

If the value produced by the Eq. (5) is smaller than the threshold used to change the compression ratio, whether or not the next pixel $Y_{b+1}$ can also be thinned is determined. This decision is also implemented by calculating the thinning errors $\Delta b$ and $\Delta'b$ associated with the individual pixels by use of Eqs. (6) and (7) and comparing them with the threshold:

$$b = a + 1 \quad c = c + 1$$

$$\Delta c = (Y_c - Y_a)/(c-a)$$

$$Y'_b = Y_a + \Delta c(b-a)$$

$$Y'_{b+1} = Y_a + \Delta c(b+1-a)$$

$$\Delta b = |Y_b - Y'_b| \qquad \text{Eq. (6)}$$

$$\Delta b_1 = |Y_{b+1} - Y'_{b+1}| \qquad \text{Eq. (7)}$$

Only when the thinning errors associated with all of the pixels are smaller than the threshold, it is determined that thinning is allowed; if the thinning error of any one of the pixels is greater than the threshold, thinning is not allowed (FIG. 18) and, in this case, the pixel $Y_{c-1}$ which immediately precedes the pixel $Y_c$ is reserved. Then, by using the particular pixel $Y_{c-1}$ as the pixel $Y_a$ (i.e. $a=c-1$) and adopting the equations $b=a+1$ and $c-b+1$, whether or not to thin the pixel $Y_b$ is determined on the basis of the same principle. Such a procedure is repeated to determined only the pixels which should be reserved.

Figure 20:
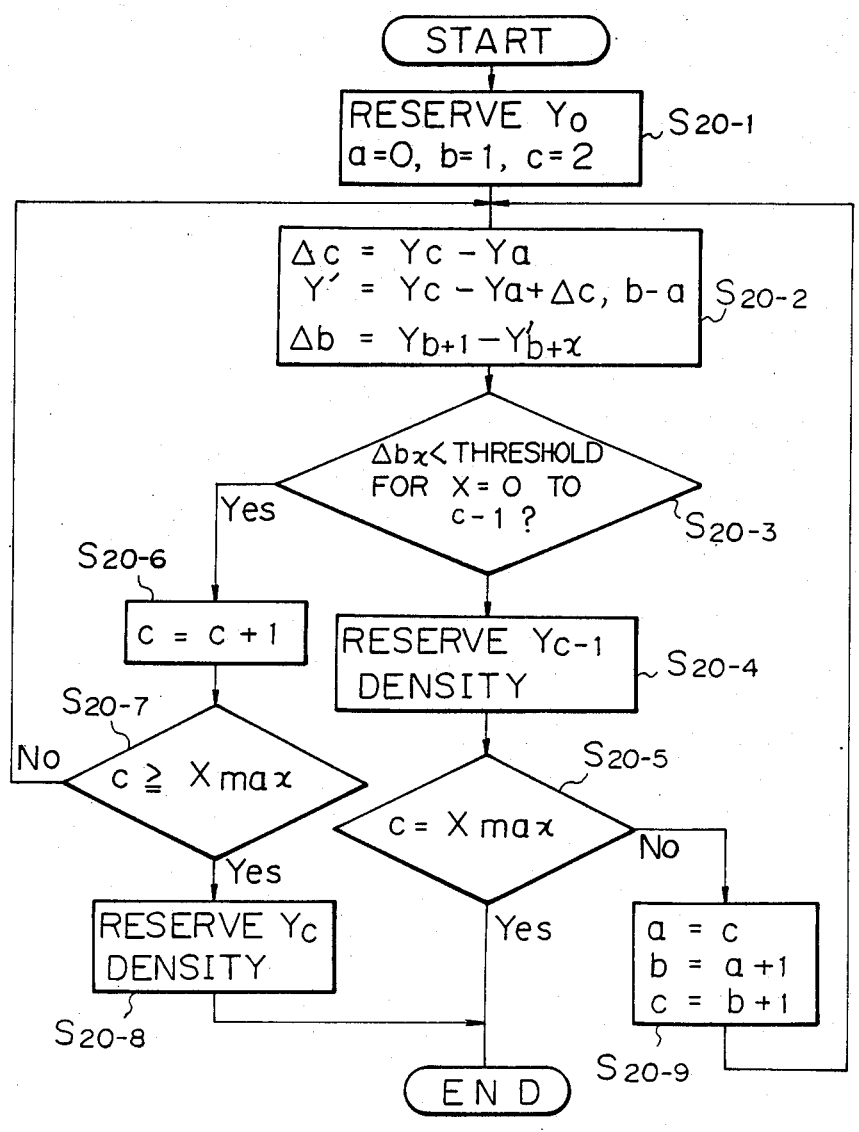
FIG. 20 is a flowchart representative of a specific operation of the fourth embodiment.

FIG. 20 is a flowchart demonstrating the above operations. As shown, whether $\Delta_x$ calculated by steps S20-1 and 20-2 is smaller or greater than the threshold with respect to x which is 0 to $c-1$ (S20-3) and, if the former is greater than the latter, the pixel $Y_{c-1}$ is reserved (S20-4). Then, whether c has reached the maximum value of x is determined (S20-5) and, if the answer of the step S20-5) is YES, the processing is ended. If $\Delta b_x$ is smaller than the threshold as decided in the step S20-3, c is incremented by 1 (one) (S20-6) and, then, whether or not c is smaller than the maximum value of x is determined (S20-7). If the answer of the step S20-7 is YES, the program continues with the processing. When the maximum value of x is reached, the density of $Y_{c-1}$ is reserved (S20-8).

As stated above, since the fourth embodiment constantly determines errors on the basis of an original image by arithmetic operations, all the pixels of a reconstructed image are free from errors greater than a predetermined value. This ensures high quality image restoration.

The first to fourth embodiments shown and described are not capable of displaying a reconstructed image unless they decode all of the density transition points without exception. In this respect, a fifth embodiment which will be described constitutes an improvement over the first to fourth embodiments.

FIFTH EMBODIMENT

Figure 21:
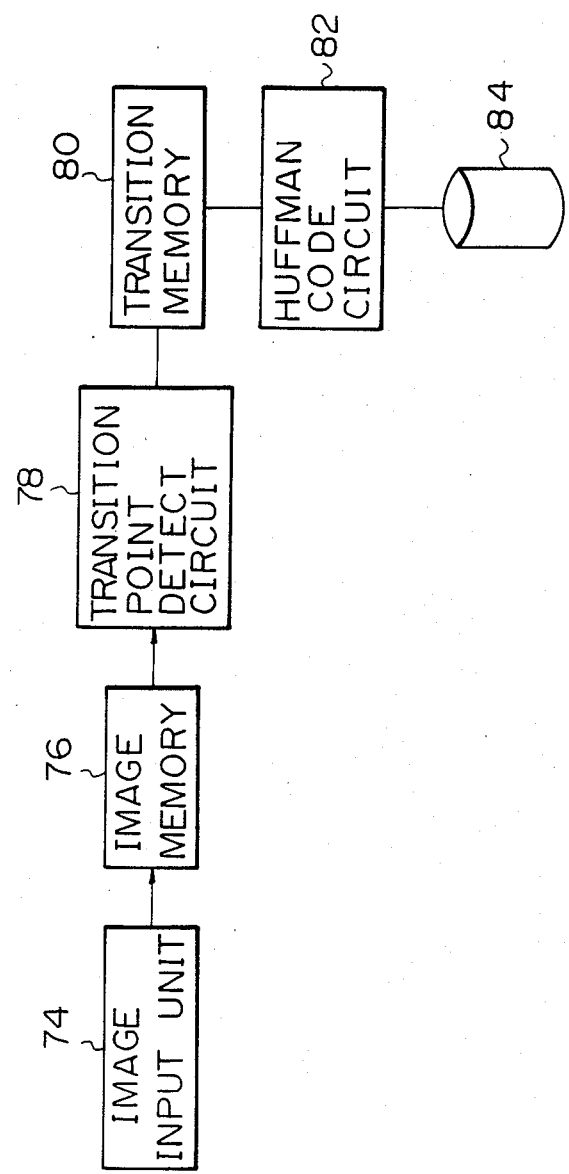
FIG. 21 is a schematic block diagram of circuitry for practicing a data compressing method representative of a fifth embodiment of the present invention.

Referring to FIG. 21, a hardware construction for practicing a fifth embodiment of the present invention, particularly a compressing method thereof, is shown. In the figure, an image inputting unit 74 reads a photograph or similar halftone image by means of a sensor, for example. An image memory 76 stores image data representative of the read image. A transition point detecting circuit 78 detects the points where the difference of density undergoes a change. A transistion memory 80 stores the positions of density transition points. A Huffman coding circuit 82 codes the densities and distances of density transition points into Huffman codes. A recording unit 84 records the coded image data.

First, the image is roughly coded by using a comparatively rough parameter for detecting the density transition points (i.e. by detecting only the pixels having substantial density differences). Specifically, an image entered from the image inputting unit 74 is stored in the image memory 76, then the image data are scanned in the horizontal direction to extract the points where the density difference undergoes a change, and then the density transition points are connected to each other. Further, the image data are scanned in the vertical direction to extract and connect the points where the density difference changes. Subsequently, the transition points are thinned on the basis of the transition points associated with the two directions, and then the density differences and distances of the transition points are coded into Huffman codes. The next layer consists in selecting a somewhat minute parameter for the detection of transition points (i.e. detecting pixels having small differences also), detecting transition points by the above-stated procedure, and coding only the transition points which have not been coded by the previous layer. These two layers of operations are repeated until a reconstructed image having desired quality appears. The coded signals are recorded in the recording unit 84.

Figure 22:
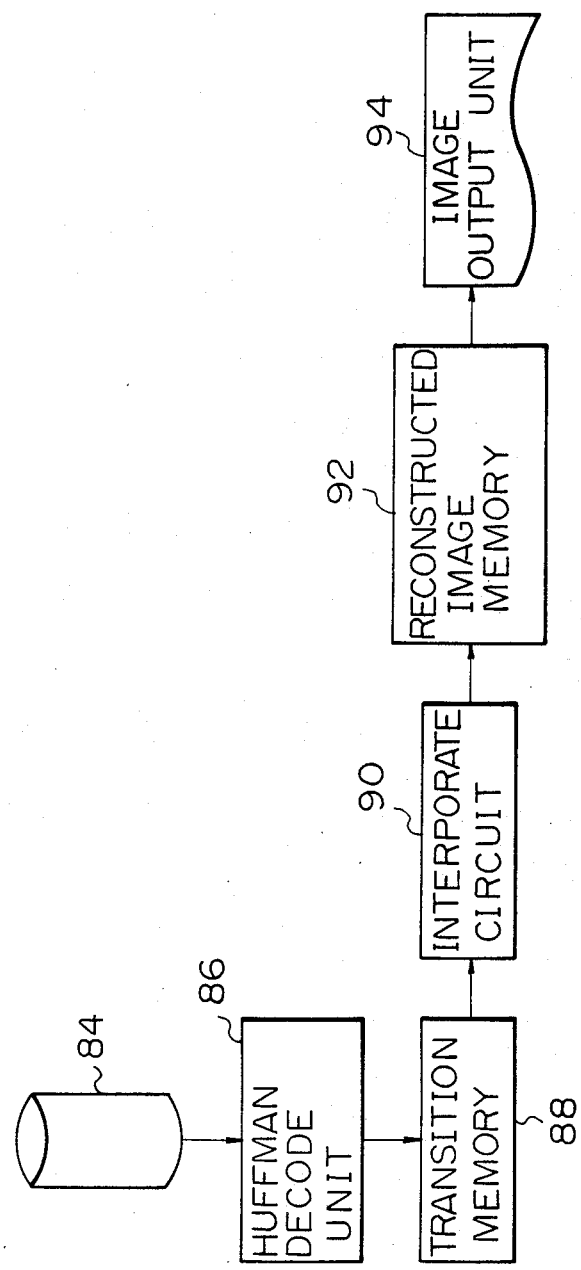
FIG. 22 is a schematic block diagram of circuitry for practicing a method of decoding image signals which have been coded by the circuitry of FIG. 21.

FIG. 22 shows circuiry for decoding the coded image signals which are produced by the circuitry of FIG. 21. In the figure, there are shown the recording unit 84, a Huffman decoding circuit 86, a transition memory 88, an interpolating circuit 90, a reconstructed image memory 92, and an image outputting unit 94. In operation, signals read out of the recording unit 84 are decoded by the Huffman decoding circuit 86. Then, based on the densities and distances of the transition points, the transition points are reconstructed and then stored in the transition memory 88. Subsequently, the transition points stored in the memory 88 are interpolated by the interpolating circuit 90. To decode the codes of the next layer, the transition points of the preceding layer are recorded, and then the Huffman codes representative of the transition points of the next layer are added to interpolate the transition points. Again, the detection and thinning of transition points may be implemented by any of the compressing methods which have been shown and described in relation to the previous embodiments. It will be seen that the fifth embodiment implements rapid search of image data merely by decoding coded pixels of the rough layer and, if necessary, displays an image by decoding coded pixels of the minute layer and thereby sequentially improving the image quality. An image, therefore, can be reconstructed without resorting to the decoding of all transition points, whereby a searching time is reduced.

In summary, any of the embodiments of the halftone image data compressing and reconstructing methods in accordance with the present invention insures restoration of an image which allows a minimum of distortions to occur.

Various modifications will become possible for those skilled in the art after receiving the teachings of the present disclosure without departing from the scope thereof.

What is claimed is:

1. A method of compressing data representative of a halftone image, comprising the steps of:
    (a) scanning input two-dimensional data representative of a halftone image in one coordinates direction and the other coordinates direction which is perpendicular to said one coordinates direction;
    (b) determining a transition pattern representative of transition points where a difference between densities of individual pixels changes, with respect to the one coordinates direction;
    (c) determining a transition pattern with respect to the other coordinates direction; and
    (d) coding densities of pixels associated with coordinates where AND of the two transition patterns is satisfied, the transition pattern of the one coordinates direction, and the transition pattern of the other coordinates direction.

2. A method of compressing data representative of a halftone image, comprising the steps of:

(a) scanning input two-dimensional data representative of a halftone image in one coordinates direction;

(b) determining a transition pattern representative of transition points where a difference between densities of individual pixels changes as determined by step (a), with respect to the one coordinates direction;

(c) scanning the data in the other direction which is perpendicular to the one coordinates direction;

(d) determining a transition pattern representative of transition points where a difference between densities of individual pixels changes as determined by step (c), with respect to the other coordinates direction;

(e) determining a vector interconnecting pixels which are closely correlated in the one coordinates direction, on the basis of the transition patterns; and (f) coding the vector only.

3. A method as claimed in claim 2, further comprising (g) dividing the input two-dimensional data into blocks on the basis of a predetermined number of scannings in the one coordinates direction.

4. A method as claimed in claim 3, wherein the scanning in steps (a) and (b) is performed in each of the blocks.

5. A method as claimed in claim 4, whereinn step (f) further comprises (h) coding the transition points in layers.

6. A method of compressing data representative of a halftone image, comprising the steps of:

(a) scanning input two-dimensional data representative of a halftone image in one coordinates direction;

(b) determining a transition pattern representative of transition points where a difference between densities of individual pixels changes as determined by step (a), with respect to the one coordinates direction;

(c) scanning the data in the other direction which is perpendicular to the one coordinates direction;

(d) determining a transition pattern representative of transition points where a difference between densities of individual pixels changes as determined by step (c), with respect to the other coordinates direction;

(e) when a pixel is to be thinned by using the transition patterns, calculating a thinning error with respect to the original image; and (f) determining whether or not to thin the pixel on the basis of the calculated thinning error.

7. A method of compressing data representative of a halftone image, comprising the steps of:

(a) removing fluctuations of minute data due to noise and other similar causes while substantially preventing important information including edges of input data from being effected;

(b) scanning in one coordinates direction the data from which fluctuations have been removed;

(c) determining a transition point pattern representative of transition points where a difference between densities of individual pixels changes as determined by step (b), with respect to the one coordinates direcion;

(d) scanning the data in the other direction which is perpendicular to the one direction;

(e) determining a transition point pattern representative of transition points where a difference between densities of individual pixels changes as determined by step (d), with respect to the other coordinates direction; and coding only a vector interconnecting pixels which are closely correlated in the one coordinates direction, on the basis of the transition point patterns.

8. A method as claimed in claim 7, further comprising (g) dividing the input two-dimensional data into blocks on the basis of a predetermined number of scannings in the one coordinates direction.

9. A method as claimed in claim 8, wherein the scanning in steps (a) and (b) is performed in each of the blocks.

10. A method as claimed in claim 9, wherein step (f) further comprises (h) coding the transition points in layers.

* * * * *